April 12, 1949.　　F. J. VAN DUSEN ET AL　　2,466,753
DEVICE FOR SWINGING SHIPS
Filed Aug. 8, 1945
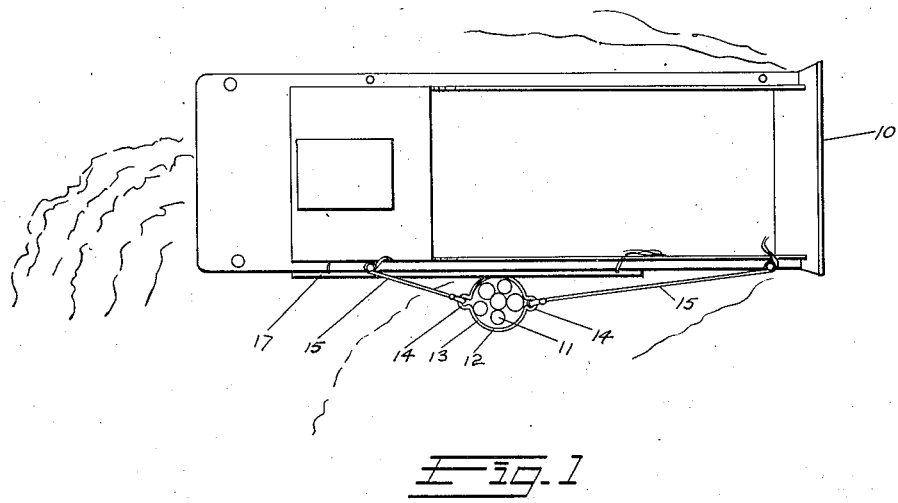
Fig. 1
Fig. 2
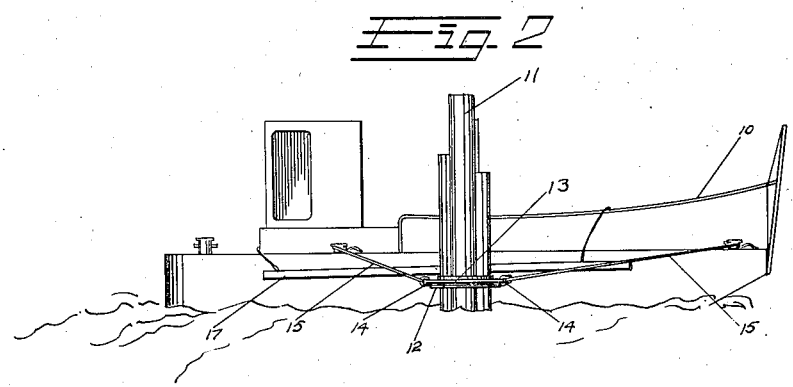
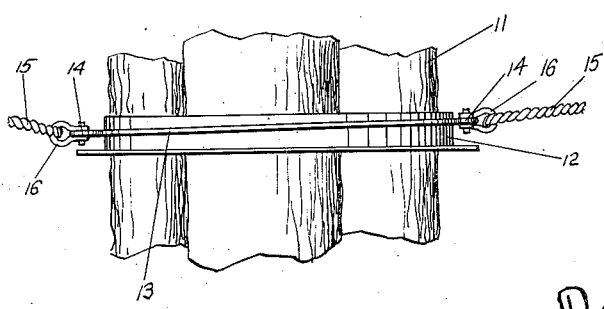
Fig. 3
INVENTORS
Frederick J. Van Dusen
Walter A. Burke
BY Ralph L. Chappell
ATTORNEY Patented Apr. 12, 1949

2,466,753

UNITED STATES PATENT OFFICE 2,466,753

DEVICE FOR SWINGING SHIP

Frederick J. Van Dusen and Walter A. Burke,
New York, N. Y.

Application August 8, 1945, Serial No. 609,703

4 Claims. (Cl. 114—0.5)

(Granted under the act of March 3, 1883, as amended April 30, 1928; 370 O. G. 757)

This invention relates to a device for swinging ship in a small area.

As is generally known, iron and steel ships, boats, and vessels in general have marked magnetic qualities and their magnetism affects magnetic compasses on board. The divergence between the correct magnet direction and the direction indicated on a magnetic compass is known as "deviation" and varies in amount for different vessels, for different headings of the same vessel, and with large changes in latitude.

In order to eliminate the effect of the ship's magnetism insofar as possible and in order to make a table or chart of the deviation remaining for various headings of the vessel, several methods are used, all of which involve steaming on many different headings. This procedure is known as "swinging ship" and requires a large, open body of navigable water, a calm sea, and good visibility, conditions not always present.

This invention presents a device for swinging ship in a small area of water, as between piers in a shipyard and can be used under almost all conditions of sea and visibility.

Reference is made to copending applications S. N. 609,705, filed August 8, 1945, and S. N. 609,704 filed August 8, 1945, which, also, discloses and claim devices for swinging ship in a small area.

An object of this invention is to provide a device for swinging ship in a small area.

Further objects and advantages of this invention, as well as its construction, arrangement and operation, will be apparent from the following description and claims in connection with the accompanying drawings in which Fig. 1 is a top plan view of a vessel with the device for swinging ship.

Fig. 2 is a side elevation of a vessel with the device for swinging ship.

Fig. 3 is a fragmentary view of the pivoting device.

A vessel whose compass is to be adjusted is designated by reference numeral 10. Vessel 10 is rotatably connected to a dolphin, spar, or piling 11 by means of annulus or ring 12 of an L shape cross section which is held on dolphin 11 by friction and gravity, or any other suitable means, and a ring 13 having two loops 14 and which is rotatably mounted on annulus 12. Vessel 10 is connected to the ring 13 by means of lines 15 which are tied to vessel 10 and connected to loops 14 by means of shackles 16.

Lines 15 are kept taut to keep vessel 10 close to dolphin 11, damage to vessel 10 being avoided by means of a fender 17 attached to vessel 10 in any suitable manner and interposed between the vessel 10 and dolphin 11.

In the operation of the device, in order to swing ship, the vessel 10 is placed on any desired heading by using its own engines and swinging the vessel 10 about the dolphin 11 which serves as a fixed pivot. The compass deviation is then determined in the usual manner.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A device for use in mooring a vessel relative to a substantially vertical dolphin, said device comprising a cylindrical collar adapted to be removably fitted about the dolphin, said collar having at its bottom end a radially extending flange, a loosely fitting ring disposed above said collar for rotary movement and retained against downward escape by said flange, said collar at its upper end being of smaller outside diameter than the inside diameter of said ring so that said ring may be slipped on and off of said collar, and means for securing said ring to a vessel.

2. A device for use in mooring a vessel relative to a substantially vertical dolphin, said device comprising an annulus adapted to be removably fitted about the dolphin, said annulus comprising a cylindrical collar engaging the dolphin and a flange extending radially from the bottom of the collar, a ring loosely fitted about said collar for rotary movement and having an inside diameter slightly greater than the outside diameter of said collar and smaller than the outside diameter of said flange, said collar at its upper end being of smaller outside diameter than the inside diameter of said ring so that said ring may be slipped on and off of said collar, and lines for connecting said ring to a vessel.

3. A device for use in mooring a vessel relative to a substantially vertical dolphin, said device comprising a single piece annulus adapted to be removably fitted about the dolphin, said annulus including a cylindrical collar adapted to engage the dolphin and a flange extending radially from the bottom of said collar, a single piece ring removably disposed for rotary movement about said collar, said ring having an inside diameter slightly larger than the outside diameter of said collar so that ring may rotate freely on said collar, said ring having an inside diameter smaller than the outside diameter of the periphery of said flange, a pair of shackles mounted in diametrically opposed relation on said ring, and a pair of lines adapted to connect said shackles to fore and aft areas of the vessel.

4. In combination with a vessel, a substantially vertical dolphin, a single-piece annulus removably fitted about said dolphin, said annulus including a substantially vertically extending cylindrical collar engaging the dolphin and a substantially horizontal flange extending radially from the bottom of said collar, a single-piece ring removably disposed for rotary movement about said collar, said ring having an inside diameter slightly larger than the outside diameter of said collar so that said ring may rotate freely on said collar and may be removed from the upper extremity of said collar, said ring having an inside diameter smaller than the outside diameter of the periphery of said flange so that said flange retains said ring against downward escape from said collar, a pair of shackles mounted in diametrically opposed relation on said ring, and a pair of lines connecting said shackles to fore and aft areas of said vessel.

FREDERICK J. VAN DUSEN.
WALTER A. BURKE.

REFERENCES CITED

The following references are of record in the file of this patent:

UNITED STATES PATENTS

| Number | Name | Date |
|---|---|---|
| 40,273 | McClain | Oct. 13, 1863 |
| 133,439 | Griffenberg | Nov. 26, 1872 |
| 144,975 | Gregory | Nov. 25, 1873 |
| 420,023 | Stifel | Jan. 21, 1890 |
| 2,395,528 | Anderson | Feb. 26, 1946 |

FOREIGN PATENTS

| Number | Country | Date |
|---|---|---|
| 703,285 | France | Feb. 3, 1931 |